(12) United States Patent
Raj

(10) Patent No.: US 9,798,638 B2
(45) Date of Patent: *Oct. 24, 2017

(54) SYSTEMS AND METHODS PROVIDING MOUNT CATALOGS FOR RAPID VOLUME MOUNT

(71) Applicant: NetApp, Inc., Sunnyvale, CA (US)

(72) Inventor: Bipul Raj, Sunnvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/732,096

(22) Filed: Jun. 5, 2015

(65) Prior Publication Data

US 2016/0019128 A1    Jan. 21, 2016

Related U.S. Application Data

(63) Continuation of application No. 13/871,670, filed on Apr. 26, 2013, now Pat. No. 9,052,995.

(51) Int. Cl.
| | |
|---|---|
| *G06F 11/07* | (2006.01) |
| *G06F 11/20* | (2006.01) |
| *G06F 12/00* | (2006.01) |
| G06F 12/0862 | (2016.01) |
| G06F 12/0868 | (2016.01) |

(52) U.S. Cl.
CPC ...... *G06F 11/2094* (2013.01); *G06F 11/0727* (2013.01); *G06F 11/0751* (2013.01); *G06F 12/00* (2013.01); *G06F 12/0862* (2013.01); *G06F 12/0868* (2013.01); *G06F 2201/85* (2013.01)

(58) Field of Classification Search
CPC ............. G06F 11/2069; G06F 11/2094; G06F 11/0727; G06F 11/1435
USPC ........................................................ 714/6.3
See application file for complete search history.

(56) References Cited

U.S. PATENT DOCUMENTS

| | | | |
|---|---|---|---|
| 7,945,724 B1 | 5/2011 | Smith et al. | |
| 2004/0250033 A1* | 12/2004 | Prahlad ............... | G06F 11/1451 711/162 |
| 2005/0235337 A1* | 10/2005 | Wilson ................ | G06F 11/1076 725/134 |
| 2005/0246382 A1* | 11/2005 | Edwards ................ | G06F 3/061 |
| 2009/0024678 A1* | 1/2009 | Milby ................... | G06F 3/0613 |
| 2010/0232288 A1 | 9/2010 | Coatney et al. | |
| 2011/0113234 A1* | 5/2011 | Augenstein .......... | G06F 3/0605 713/150 |

(Continued)

*Primary Examiner* — Chae Ko
(74) *Attorney, Agent, or Firm* — LeClairRyan, a Professional Corporation

(57) ABSTRACT

Systems and methods which provide mount catalogs to facilitate rapid volume mount are shown. A mount catalog of embodiments may be provided for each aggregate containing volumes to be mounted by a takeover node of a storage system. The mount catalog may comprise a direct storage level, such as a DBN level, based mount catalog. Such mount catalogs may be maintained in a reserved portion of the storage devices containing a corresponding aggregate and volumes, wherein the storage device reserved portion is known to a takeover node. In operation according to embodiments, a HA pair takeover node uses a mount catalog to access the blocks used to mount volumes of a HA pair partner node prior to a final determination that the partner node is in fact a failed node and prior to onlining the aggregate containing the volumes.

18 Claims, 3 Drawing Sheets

(56) References Cited

U.S. PATENT DOCUMENTS

| | | | |
|---|---|---|---|
| 2013/0086585 A1 | 4/2013 | Huang et al. | |
| 2013/0151802 A1* | 6/2013 | Bahadure | G06F 3/0605 |
| | | | 711/162 |
| 2014/0214772 A1 | 7/2014 | Kadayam | |
| 2014/0330787 A1 | 11/2014 | Modukuri et al. | |
| 2015/0169225 A1* | 6/2015 | Curley | G06F 3/0619 |
| | | | 711/162 |
| 2016/0085842 A1* | 3/2016 | Cho | G06F 17/30598 |
| | | | 707/737 |

* cited by examiner

SYSTEMS AND METHODS PROVIDING
MOUNT CATALOGS FOR RAPID VOLUME
MOUNT

This application is a continuation of U.S. patent application Ser. No. 13/871,670, filed Apr. 26, 2013, which is hereby incorporated by reference in its entirety.

TECHNICAL FIELD

The invention is directed generally to operation of data storage systems and, more particularly, to implementing one or more mount catalogs to facilitate rapid volume mount, such as during data storage system partner node takeover.

BACKGROUND OF THE INVENTION

The creation and storage of digitized data has proliferated in recent years. Accordingly, various storage systems that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices (e.g., disk drives, solid state drives (SSD), etc.) configured to store digital data within data volumes. For example, various data storage devices, or portions thereof, may be combined to form an aggregate, whereby such aggregates may provide storage space for volumes. In operation, various cluster and node components of the cluster network environment interact to provide storage services to clients using the aforementioned volumes.

Data storage systems often implement configurations adapted to facilitate robust data storage operation. For example, a high availability (HA) pair configuration, wherein nodes of the data storage system are paired (such pairing may include N-way pairing) to provide continued access to data store volumes in the event of a failure or malfunction of a node, in order to maintain availability of the stored data. In operation, a node of a HA pair takes over for a failed partner node of the HA pair by mounting the volumes belonging to that partner node. Accordingly, although data throughput may be impacted due to the takeover node providing access to its own volumes and those of the failed node, the volumes of the failed node and the data stored thereon nevertheless remain available to storage system clients.

A volume mount (i.e., access information regarding the data storage device(s) storing the volume and configure the filesystem no as to place the volume in a position to operate), as implemented by existing HA pair implementations, requires serial completion of a plurality of steps which require appreciable time to complete (e.g., on the order of 5-10 seconds), making the volumes of a HA pair failed node unavailable for an appreciable period of time. In particular, the existing volume mount process requires reading several random storage device blocks (e.g., blocks containing the volume information, such as may contain file system information, block allocation map information, directory information, etc.) serially and constructing various in-core data structures. As mounting takes place before a computer can use a data storage device (i.e., mounting makes the data storage device accessible through the computer's filesystem), the foregoing time to mount a takeover volume results in appreciable delay in the availability of that volume.

In takeover of a failed node's volumes, the HA pair takeover node of existing implementations must first determine that the HA pair partner node is indeed a failed node. This is because if the volume mount techniques utilized by these HA pair implementations are initiated by a takeover node while the partner node continues to operate and write to its volumes the data stored by those volumes would be corrupted (e.g., the blocks which are required to be read to mount the volume may be altered by the partner node while the putative takeover node is mounting to volume resulting in corrupted data if the volume were to be accessed with the out-of-date blocks). Once the HA pair takeover node has determined that its HA pair partner node is a failed node, the takeover node then begins the process of bringing the data storage device aggregate(s) of the HA pair failed node online (referred to as "onlining"). Until the aggregate has been onlined, the cache which maps the physical volume block numbers (PVBNs) used by the volumes to the disk block numbers (DBNs) of the storage devices is not available. Thus, the volumes of the failed node cannot be mounted until the aggregates containing those volumes has been onlined. Once the aggregate has been onlined, the PVBNs for the blocks which are required to be read to mount a volume may be utilized in pre-fetching those blocks and mounting the respective volumes.

To summarize the foregoing volume mount process implemented by a HA pair takeover node, the takeover node must determine that a partner node has failed, then the takeover node must online the aggregates of the failed node, and only then can the takeover node use the PVBNs of the aggregates to mount the volumes. As can be appreciated from the foregoing, a volume mount process is I/O bound and a relatively slow process making the takeover process lengthy. Such a lengthy volume mount process is not desirable or acceptable for some applications, such as tier-1 applications (e.g., mission critical applications requiring high levels of reliability or quality of service).

If all the blocks which are required to be read to mount a volume are already present in-core, then a volume mount process can be accomplished faster because the disk I/O bottleneck is avoided. Accordingly, techniques such as an "adaptive playlist," as shown and described in U.S. Pat. No. 7,945,724 entitled "Non-Volatile Solid-State Memory Based Adaptive Playlist for Storage System Initialization Operations," the disclosure of which is hereby incorporated herein by reference, provide pre-fetching of all the blocks required to mount volume. For example, an adaptive playlist technique maintains a per-volume metafile which contains list of PVBNs required to be read to mount the volumes. Before mounting a volume all the PVBNs are pre-fetched in memory doing parallel I/O to disks, thereby making the volume mount operation faster. The volume mount, however, needs to wait for all the blocks to be pre-fetched, which does not scale if there are hundreds of volumes to mount during takeover.

Another technique for providing all the blocks which are required to be read to mount a volume in-core implements mirroring. A mirror approach operates to mirror the blocks required to mount the volumes to the HA pair partner node periodically (e.g., at each consistency point (CP), wherein consistency points are checkpoints or a snapshot in time in the write cycle of the filesystem) so that the information of all of the blocks required to mount partner volumes is already present in the memory of the takeover node when a failure of a partner node occurs. This approach, however, is quite costly in terms of processing resources and communication bandwidth. In particular, a mirror approach may be too costly due to its implementation increasing CP path length and interconnect traffic to mirror blocks to a HA pair partner node. The mirror approach does not scale well because, as the number of volumes increases, more data needs to be mirrored consuming both CPU and memory at the HA pair partner nodes. Moreover, such mirror techniques do not work for N-way HA pairings where any node can takeover a sub-set of volumes belonging to the failed node. In a worst case scenario, if the node crashes in the middle of mirroring then volume mount during takeover would need to access the data from the disk blocks rather than the mirrored data in the takeover node memory (i.e., the partial mirror data would be corrupt).

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
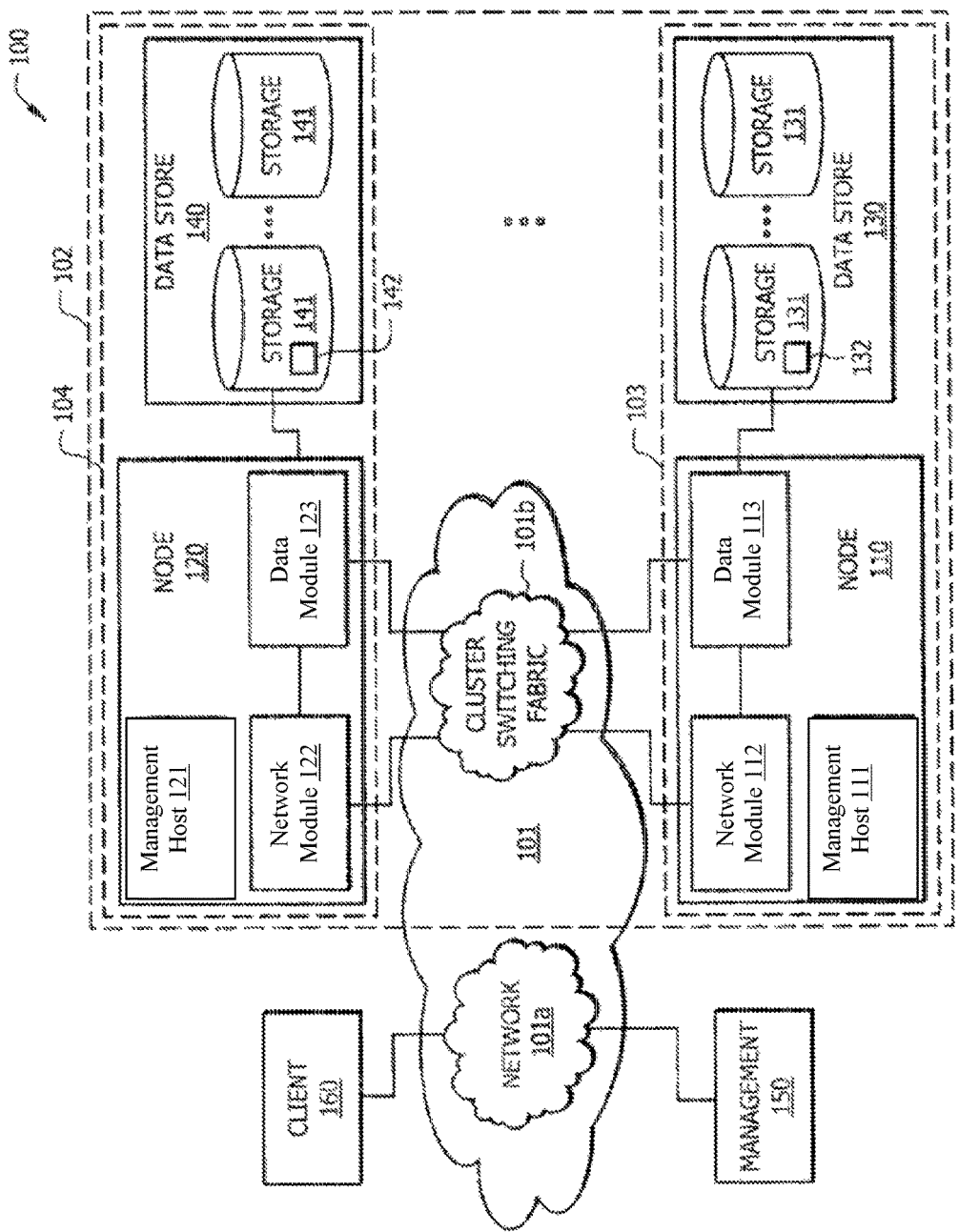
FIG. 1 shows a block diagram of a system adapted to provide one or more mount catalog to facilitate rapid volume mount according to embodiments of the invention.

Embodiments of the present invention comprise systems and methods which provide mount catalogs to facilitate rapid volume mount, such as during data storage system partner node takeover. A mount catalog may, for example, be provided for each aggregate containing volumes to be mounted by a takeover node of a storage system.

Embodiments herein implement a DBN based mount catalog for rapid volume mount during takeover in a HA pair storage system architecture. For example, a DBN mount catalog of embodiments contains storage device ID information and corresponding DBN information for HA pair node blocks used to mount volumes and aggregates containing those volumes. Such DBN based mount catalogs may be maintained in a reserved portion of the storage devices containing the aggregate, wherein the storage device reserved portion is known to the takeover node.

In operation according to embodiments of the invention, a HA pair takeover node uses a mount catalog to access the blocks used to mount volumes of a HA pair partner node prior to a final determination that the partner node is in fact a failed node. Likewise, the takeover node is able to access the blocks used to mount volumes of the partner node prior to onlining the aggregate containing the volumes. Accordingly, the information in the blocks used for mounting volumes is read at a much earlier stage of takeover (e.g., even before RAID (redundant array of independent disks) assimilation). For example, acquisition of the information in the blocks can be done in failure detection phase, which takes 5 to 10 seconds time, so that the volume mount is not blocked for any pre-fetching and disk reads. Thus, use of mount catalogs of embodiments herein allows partner volume mount during takeover without waiting for pre-fetching of the blocks, thus when volume mount starts during takeover all the blocks are available in memory making volume mount operation during takeover much faster.

It should be appreciated that mount catalog embodiments of the invention do not present scalability issues as the number of volumes increases. For example, embodiments herein do not have any mirroring overhead between HA pair nodes which would present scalability issues. Moreover, the mount catalogs of embodiments herein work with N-way HA pairing implementations. Thus, embodiments of the invention provide a robust, scalable solution to solve aggregate and volume mounting problem during takeover, thereby making takeover process much faster.

Although embodiments of the invention have been discussed with reference to partner node takeover volume mount, the concepts herein are applicable to any number of volume mount scenarios. For example, embodiments may be utilized to facilitate rapid aggregate and volume mount during boot. During an initial boot process, the blocks used to mount the aggregate and volumes can be pre-fetched so that there is no pre-fetching and disk I/O bottleneck while aggregate and volumes are being mounted during boot time.

It should be appreciated that although the term "disk block number" is used with respect to embodiments of the invention, the concepts herein are not limited to use with respect to any particular storage device configuration. Accordingly, the mount catalogs described herein may be utilized with respect to any number of storage device configurations, including hard disk drives, solid state drives, optical disks, flash memory, etc. operable to store user and/or other data.

FIG. 1 shows a block diagram of a system adapted according to embodiments of the invention to provide one or more mount catalog to facilitate rapid volume mount, such as during data storage system partner node takeover. System 100 of FIG. 1 comprises an exemplary clustered network environment in which storage system 102 includes data storage sub-systems 103 and 104 coupled via network 101. Data storage sub-systems 103 and 104 of embodiments may comprise one or more modules, components, etc. operable to provide operation as described herein. For example, data storage sub-systems 103 and 104 of the illustrated embodiment comprise nodes 110 and 120 and data store devices 130 and 140, respectively. It should be appreciated that, although not expressly shown in the illustration of FIG. 1, data communication paths may be provided between nodes 110 and 120 and data store devices 130 and 140 associated with another node (e.g., data communication paths between node 110 and data store devices 140 and/or data communication paths between node 120 and data store devices 130), such as for use in HA pair failover operation.

Nodes and/or data store devices of data storage sub-systems 103 and 104 may themselves comprise one or more modules, components, etc. For example, nodes 110 and 120 of the illustrated embodiment comprise management modules 111 and 121, network modules 112 and 122, and data modules 113 and 123, respectively. Data store devices 130 and 140 of the illustrated embodiment comprise one or more storage media 131 and 141 (e.g., hard disk drives, solid state drives, optical disks, flash memory, etc.) operable to store user and/or other data, respectively.

The modules, components, etc. of data storage sub-systems 103 and 104 may comprise various configurations suitable for providing operation as described herein. For example, nodes 110 and 120 may comprise processor-based systems, such as file server systems, computer appliances, computer workstations, etc. Accordingly, nodes 110 and 120 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 130 and 140 may, for example, comprise disk memory, flash memory, optical memory, and/or other suitable computer readable media and associated circuitry (e.g., interfaces, controllers, decoders, etc.). Data modules 113 and 123 of nodes 110 and 120 may be adapted to communicate with data store devices 130 and 140 according to a storage area network (SAN) protocol (e.g., small computer system interface (SCSI), fiber channel protocol (FCP), INFINIBAND, etc.) and thus data store devices 130 and 140 may appear as a locally attached resources to the operating system. That is, as seen from an operating system on nodes 110 and 120, data store devices 130 and 140 may appear as locally attached to the operating system. In this manner, nodes 110 and 120 may access data blocks of storage media 131 and 141 through the operating system, rather than expressly requesting abstract files.

Network modules 112 and 122 may be configured to allow nodes 110 and 120 to connect with various systems, such as management system 150 and/or client system 160, over network connections provided by network 101 to allow such systems to access data stored in data storage sub-systems 103 and 104 and/or to otherwise provide communication with respect to other components of storage system 102. Moreover, network modules 112 and 122 may provide connections with one or more other components of system 100, such as through network 101. For example, network module 122 of node 120 may access data store device 130 via communication via network 101 and data module 113 of node 103. The foregoing operation provides a distributed storage system configuration for system 100.

Nodes of system 100 may be provided in a HA pair configuration, wherein two or more nodes are paired (such pairing may include N-way pairing) to provide continued access to data store volumes of the data store devises in the event of a failure or malfunction of a node. In operation, a node of a HA pair takes over for a failed partner node of the HA pair by mounting the volumes belonging to that partner node. For example, nodes 110 and 120 may comprise a HA pair configuration such that data module 123 of node 120 may access data store device 130 via communication via network 101. This operation facilitates takeover of volumes of data store 130 by node 120 in a failover situation with respect to node 110.

System 100 of the illustrated embodiment includes one or more client systems, represented here as client 160, for which access to and/or communication with storage system 102 is provided. For example, data storage services may be provided to one or more such clients by storage system 102. Accordingly, applications operable upon client 160 may interact with components of storage system 102 via network 101 to store data, access data, manage data, etc. It should be appreciated that, although referred to as clients, such client systems may comprise systems traditionally thought of as client systems (e.g., termination points for the data stored by data store devices 130 and 140) as well as systems traditionally thought of as server systems (e.g., systems providing data handling and/or management services to other systems) which are nevertheless clients of storage system 102.

System 100 may further include one or more management systems, represented here as management system 150, for providing management services with respect to storage system 102. Management system 150 may, for instance, communicate with nodes 110 and 120 across network 101 to control performance of various operations and to request information from or provide information to the nodes. In addition, management system 150 may be configured to receive inputs from and provide outputs to a user of system 100 (e.g., storage administrator) thereby operating as a centralized management interface between the administrator and system 100. It should be appreciated that, although management system 150 is illustrated as a single functional block, management system 150 of embodiments may comprise a number of systems, components, etc., such as a plurality of servers providing functionality as described herein.

Systems of embodiments provided access to and otherwise provide communication with storage system 102, such as management system 150 and client 160, comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. Although the systems of the illustrated embodiment provide communication with components of storage system 102 via network 101, it should be appreciated that other embodiments of the present invention may employ different means of providing the requisite communication with respect to client systems and/or management systems herein.

Network 101 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. It should be appreciated that network 101 may comprise various forms, and even separate portions, of network infrastructure. For example, nodes 110 and 120 may be interconnected by cluster switching fabric 101b while nodes 110 and 120 may be interconnected to other systems, such as management system 150 and/or client system 160, by a more general data network (e.g., the Internet, a LAN, etc.).

As can be appreciated from the foregoing, system 100 provides an embodiment of a data storage system in which various digital data may be created, maintained, modified, and accessed (referred to collectively as data management). A logical mapping scheme providing logical data block mapping information, stored within and stored without the data structures, may be utilized by system 100 in providing such data management. For example, a filesystem implemented by data store devices 130 and 140 may implement a logical data block allocation technique. In an exemplary configuration of system 100, client 160 can utilize storage system 102 to store and retrieve data from volumes maintained by the filesystem implemented by data store devices 130 and 140. In such an embodiment, for example, client 160 can send data packets to network module 122 in node 120 within data storage sub-system 104. Node 120 can forward the data to data store device 140 using data module 123, where data store device 140 comprises the volume being accessed by client 160. In this way, in this example, the client can access the storage to store and/or retrieve data, using data storage sub-system 104 connected by network 101. Further, in this embodiment, client 160 can exchange data with network module 112 in node 110 within data storage sub-system 103 (e.g., which may be remote from data storage sub-system 104). Node 110 can forward the data to data storage device 130 using data module 113, thereby accessing one or more volumes associated with the data storage device 130.

The foregoing data store devices each comprise a plurality of data blocks, according to embodiments herein, which may be used to provide various logical and/or physical storage containers, such as files, container files holding volumes, aggregates, virtual disks, etc. Such logical and physical storage containers may be defined using an array of blocks indexed or mapped either logically or physically by the filesystem using the appropriate type of block number. For example, a file may be indexed by file block numbers (FBNs), a container file by virtual block numbers (VBNs), an aggregate by physical block numbers (PBNs), a volume by physical volume block numbers (PBVNs), and disks by disk block numbers (DBNs). To translate an FBN to a disk block, a filesystem (e.g., a write anywhere file layout (WAFL®) filesystem provided by NetApp, Inc. of Sunnyvale, Calif.) may use several steps, such as to translate the FBN to a VBN, to translate the VBN to a PBN, and then to translate the PBN to a DBN. Storage containers of various attributes may be defined and utilized using such logical and physical mapping techniques. For example, the aforementioned volumes may be defined to comprise aggregates (e.g., a traditional volume) and/or flexible volumes (e.g., volumes built on top of traditional volumes as a form of virtualization) using such logical and physical data block mapping techniques.

It can be appreciated from the foregoing that the process of mounting a volume can involve a relatively long process, such as consuming 5-10 seconds which is an appreciably long period of time in the data access demands of today. For example, using the respective types of block numbers implemented by the file system, the node mounting the volume onlines the aggregate(s) using PBNs and creates a cache to map the PVBNs for the volumes. Thereafter, the node may mount the volume(s) of the aggregate(s) using the PBVNs. This process is the same, where the foregoing file system implement block number types are utilized, for both mounting volumes on boot and mounting volumes in a HA pair failover situation. However, in the HA pair failover situation additional delay is added prior to the onlining of the aggregate(s) because the HA pair takeover node first determines that its HA pair partner node is a failed node in order to avoid corrupting the data in a situation where multiple nodes of the HA pair have mounted the volume.

System 100 of the illustrated embodiment is, however, adapted to provide mount catalogs to facilitate rapid volume mount. For example, data store device 130 includes one or more mount catalog 132 stored by storage media 131 thereof and data store device 140 includes one or more mount catalog 142 stored by storage media 141 thereof. Although the illustrated embodiment shows a representation of one mount catalog in each of data store devices 130 and 140, the illustration is intended to be representative of the inclusion of mount catalogs and is not limiting with respect to the number or even storage location of the mount catalogs.

Figure 2:
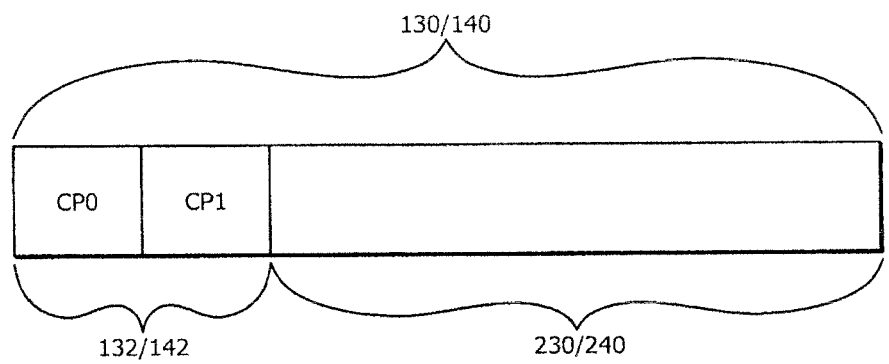
FIG. 2 shows a mount catalog as may be provided for each aggregate containing volumes to be mounted by a takeover node of a storage system according to embodiments of the invention.

In accordance with embodiments of the invention, a mount catalog is provided for each aggregate containing volumes to be mounted by a takeover node of a storage system, as represented in FIG. 2. In particular, in the embodiment illustrated in FIG. 2 mount catalog 132/142 is stored in disk space of data store device 130/140 containing a corresponding aggregate 230/240. Where multiple aggregates are present in the disk space, embodiments of the invention would include multiple mount catalogs corresponding to the multiple aggregates. Each such mount catalog of embodiments comprises information for mounting each volume of the respective aggregate.

Mount catalogs provided according to embodiments of the invention are robust and thus are adapted to facilitate detection and/or correction of the data contained therein and to accommodate storage media failure scenarios. For example, the mount catalogs of embodiments are parity protected as part of the RAID group they are stored within. Additionally or alternatively, mirroring techniques may be implemented with respect to the mount catalogs to provide a mirror copy so that in case the storage media containing a mount catalog fails; the mount catalog can be accessed using the mirror copy.

Although not limited to the particular storage media illustrated in FIG. 1, or even to storage in a single storage medium, mount catalogs of embodiments herein are stored in a reserved portion of the storage devices. For example, a reserved portion used for mount catalog storage can be allocated when aggregate is created, whereby such a reserved portion of the aggregate it is not part of the filesystem address space belonging to the aggregate. Such a mount catalog may thus be written in place always, and thus not written through filesystem write allocation (e.g., avoiding different block allocation of a WAFL or other filesystem). In facilitating operation according to embodiments herein, the storage device reserved portion location (e.g., the DBNs storing the mount catalogs) is known to the nodes adapted to use the particular mount catalogs. Accordingly, once the mount catalog is maintained at the pre-defined reserved portion, then a node (e.g., HA pair partner node) can always find the location of the mount catalog.

Figure 3:
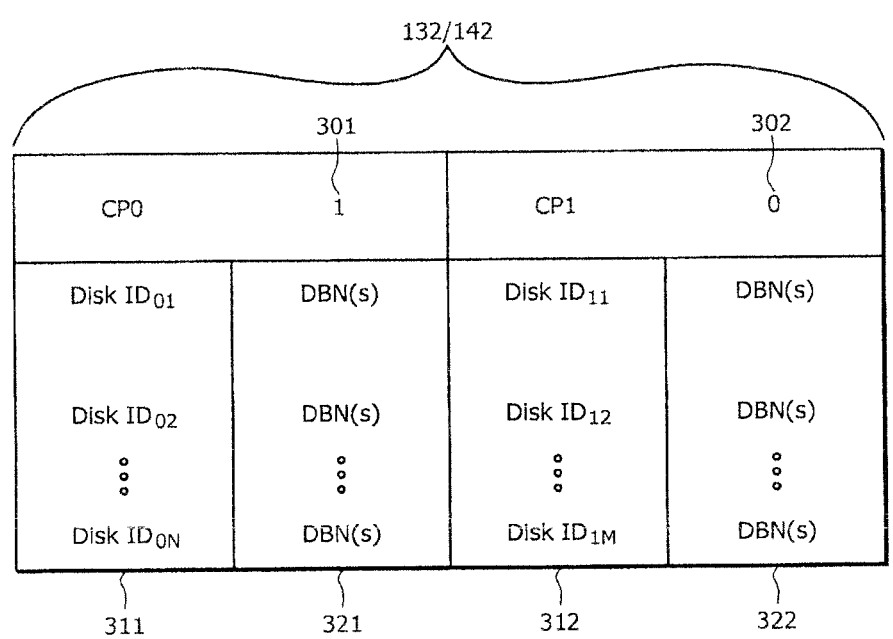
FIG. 3 shows a DBN mount catalog configuration of embodiments of the invention.

Mount catalogs 132 and 142 of embodiments provide a DBN based mount catalog configuration. For example, a DBN mount catalog of embodiments of mount catalogs 132 and 142 comprise storage device ID information 311 and 312 and corresponding DBN information 321 and 322 for HA pair node blocks used to mount volumes and aggregates containing those volumes, as shown in FIG. 3. The storage device ID information of embodiments identifies the particular storage media (e.g., a particular disk drive) of the data store storing at least a portion of the volume mount information for a respective aggregate. The DBN information may comprise individual disk block numbers, disk block number ranges, etc. identifying the disk blocks in which the information for mounting the volumes is stored. The information stored in the identified disk blocks may, for example, comprise volume information, such as file system information, block allocation map information, directory information, etc. As can be appreciated from the foregoing, a DBN based mount catalog of embodiments herein may comprise a list of disk IDs and list of DBNs for each disk ID to be read to mount the aggregate and all volumes within the aggregate.

Mount catalogs implemented according to embodiments of the invention are updated periodically as the information used to mount a volume changes. For example, where a WAFL file system is implemented (e.g., wherein block allocation within the volume changes as writes are performed), the mount catalogs are preferably updated in every CP performed on the respective aggregate. For example, a mount catalog can be prepared by a node associated with the data storage device(s) of an aggregate (e.g., node 110 for aggregate(s) of data store devices 130, node 120 for aggregate(s) of data store devices 140, etc.) while a CP is happening so that the mount catalog is up to date at the end of the CP. Embodiments implement two copies of a mount catalog to accommodate such updates. For example, one mount catalog may be provided for the last CP and another for the ongoing CP which is being updated in the CP. An embodiment of these two copies of a mount catalog are shown as mount catalog copy CP0 and mount catalog copy CP1 in FIGS. 2 and 3. A bit or flag may be set with respect to a particular copy of the mount catalog, as shown by flag bits 301 and 302 of FIG. 3, to indicate the particular mount catalog copy which is current at any particular time. Such a flag bit may be updated at a CP when the mount catalog copy update is completed.

It should be appreciated that, although there may be some additional disk seek penalty in every CP to update mount catalogs, such a seek penalty will be very minimal according to embodiments herein. In particular, the mount catalogs will be very small (e.g.; containing the aforementioned DBN list) according to embodiments of the invention. To provide an example of the size of a mount catalog provided according to the concepts herein, typically around 25 blocks need to be read in order to mount one volume. Thus, a DBN based mount catalog may comprise entries for approximately 25 DBNs per volume. Assuming 500 volumes in one aggregate, approximately 100 KB of data would be included in a DBN based mount catalog (having an 8 byte DBN address space) for the aggregate. A 100 KB mount catalog will occupy 25 blocks in a typical disk storage system.

In operation according to embodiments of the invention, a HA pair takeover node uses a mount catalog to access the blocks used to mount volumes of a HA pair partner node. For example, where nodes 110 and 120 are configured as a HA pair, data module 123 of node 120 (in this example, the takeover node) may utilize mount catalog 132 of data store device 130 of node 103 (in this example, the failed node) to mount the volumes of an aggregate associated with node 110 which are stored by storage media 131 of data store device 130. As previously mentioned, mount catalog 132 may include a flag bit to indicate which mount catalog copy (e.g., either CP0 or CP1) belongs to the last successful CP, so that node 120 will access a consistent copy of the mount catalog. Accordingly, during takeover the partner node (in this example, node 120) can use the mount catalog belonging to the last successfully completed CP.

The information pre-fetched from the blocks identified by the mount catalog is read into memory of the node for later use in mounting the volumes. Embodiments implement a cache (e.g., a DBN based cache) to locate pre-fetched blocks while the volume is mounting during takeover. For example, a lower level cache which mapping "disk ID" and "DBN" to a pre-fetched blocks may be implement. Such a cache would be utilized only during volume mount phase of takeover according to embodiments and thus may be discarded thereafter or for other scenarios.

Since the mount catalog of embodiments herein is maintained at a direct storage level, such as the aforementioned DBN level, the partner node does not need to wait until the aggregate comes online to pre-fetch the blocks to mount volumes. Accordingly, in the HA pair failover situation, the takeover node is enabled to access the blocks used to mount the volumes of a failed node prior to a final determination that the partner node is in fact a failed node, and even prior to onlining the aggregate containing the volumes. In operation according to embodiments, a node can start reading the mount catalog as soon as partner node suspects a failure of a partner node, such as through detection of a heartbeat failure (e.g., the failure to receive a heartbeat signal from a partner node). During the ensuing node failure detection phase (e.g., heartbeat signal is not received within a predetermined window of time, monitoring of the partner disk I/O is performed to verify that the partner node is not accessing the storage media, etc.), which typically takes 5 to 10 seconds of time, the node suspecting failure of a partner node can aggressively pre-fetch the blocks used to mount the aggregate(s) and volume(s) of that partner node.

It should be appreciated that the node failure detection phase is generally sufficiently long to facilitate reading the information from blocks used to mount thousands of volumes, thereby allowing the information for mounting these volumes to easily be pre-fetched before RAID assimilation and aggregate and volume onlining according to embodiments herein. For example, in order to mount a volume 20 to 30 blocks are typically read. For 1000 volumes, 30000 random blocks (e.g., approximately 120 MB of data) may be pre-fetched in parallel, which can be easily accomplished in 2-3 seconds while a node failure detection phase is being performed.

As can be appreciated from the foregoing, the information in the blocks used for mounting volumes is read at a much earlier stage of takeover. Upon conclusion of the node failure detection phase, wherein it is determined that the partner node has failed, the node suspecting failure of a partner node may thus have all or at least a portion of the information used for mounting the volumes in its memory, thereby facilitating rapid mounting of the volumes. It should be appreciated that such a mount catalog provides excellent performance for volume mounting during takeover, even as compared to prior solutions storing playlists in the SSD tier, because the blocks used to mount the volumes are present in memory when volume mount starts during takeover. In the case of SSD storage of the information by prior solutions, the data would need to be read from the SSD to memory, which would be 1000 times slower than just reading directly from memory. Moreover, because acquisition of the information in the blocks is done according to embodiments herein in the failure detection phase, the volume mount is not blocked or delayed for pre-fetching and disk reads.

The operation of the node reading the information in the blocks identified by a mount catalog according to embodiments herein is adapted to avoid the potential for problems associated with multiple nodes of the storage system mounting a same volume. In particular, the reading of information from the blocks identified in the mount catalog is accomplished without actually mounting the volumes, which is done after the failure detection phase has determined that the partner node has failed. There is no harm in pre-fetching the blocks used to mount the partner volumes upfront using the mount catalog of embodiments herein. Where the partner node is determined not to have failed after commencement of pre-fetching the blocks identified by the mount catalog, the node having read this information may simply ignore that information (e.g., discard the information, purge the information from its memory, leave the information in-core but unused, etc.) with no harm to the operation of the partner node determined to be operable.

As an example of a situation where a node of a HA pair may erroneously suspect that a partner node has failed, the aforementioned heartbeat failure used in the initial suspicion of partner node failure may be because of the split brain configuration. That is, because the HA pair comprises a plurality of operational components (e.g., the paired nodes) operating under the control of separate control intelligence (e.g., "split brain"), the individual components may each be operational while one or more of the components is unable to determine the state of its partners. Thus the configuration implemented according to the foregoing exemplary mount catalog embodiment operates to ignore the information it has pre-fetched from the blocks identified in the mount catalog when it is later determined that the partner node has not failed, such as due to the aforementioned split brain configuration.

It should be appreciated from the foregoing that a situation may present itself where a node begins pre-fetching blocks using the copy of mount catalog belonging to a last successful CP (e.g., mount catalog copy CP0 as indicated by flag bit 301), but the partner node has not actually failed and thus it completes its current CP, updates the copy of the mount catalog belonging to the current CP (e.g., mount catalog copy CP1), and in the next CP begins overwriting the copy of the mount catalog (e.g., mount catalog copy CP0) belonging to the last CP which is being used by the other node to pre-fetch blocks. Embodiments prevent such situations by the node which completes its current CP setting an on-disk state of the catalog (e.g., an additional flag bit, not shown) before overwriting the catalog belonging to the last CP, so that the node reading the blocks identified by the mount catalog may detect the operation of the partner node and can stop accessing the mount catalog and ignore the pre-fetched information.

Figure 4:
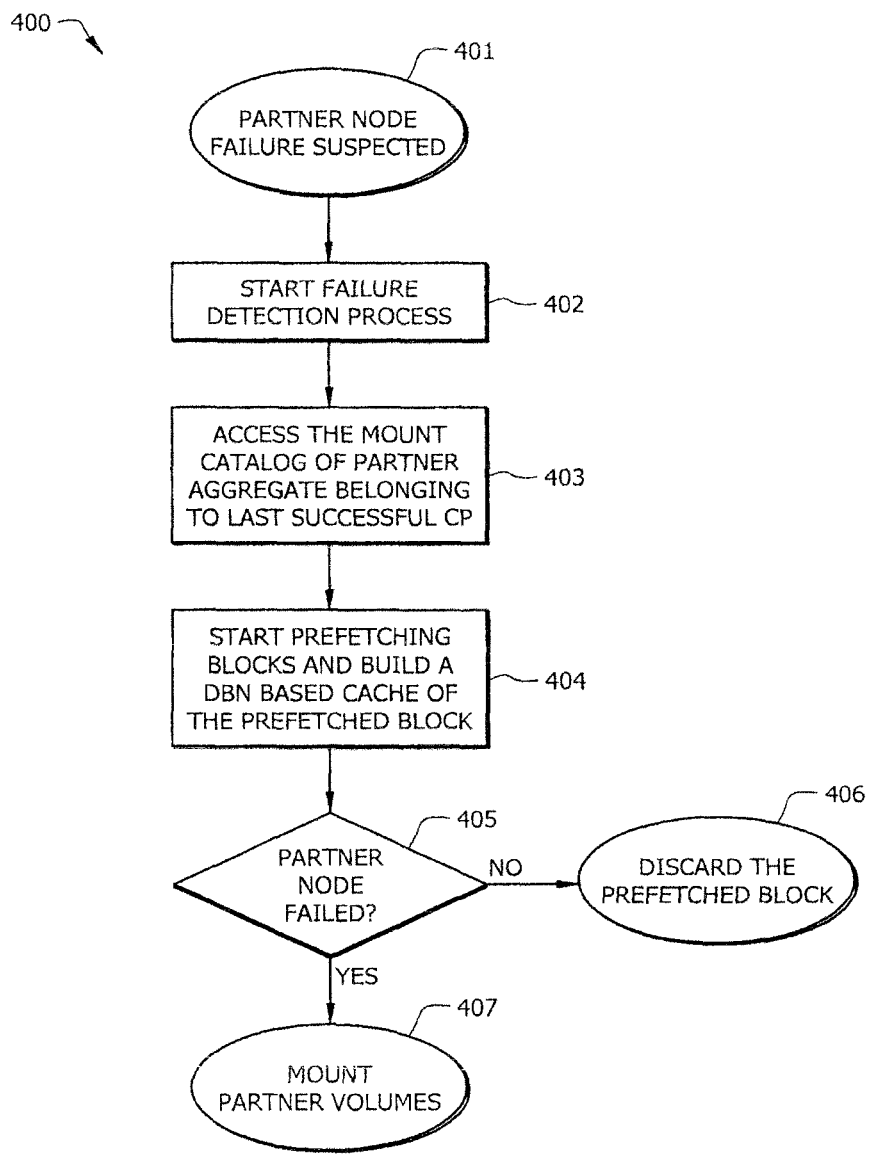
FIG. 4 shows a flow implemented by a node to takeover for a failed partner node for mounting volumes belonging to that partner node according to embodiments of the invention.

FIG. 4 shows flow 400 implemented according to embodiments of the invention where a node operates to takeover for a failed partner node mounting volumes belonging to that partner node. The processes of flow 400 may be performed by logic (e.g., one or more processor operating under control of an instruction set) of components of storage system 102 (e.g., management modules 111/121, network modules 112/122, and/or data modules 113/123 of a takeover node of nodes 110/120). In operation according to embodiments, a management module of the takeover node (e.g., a respective one of management modules 111/121) operates to coordinate operation of an associated data module of the takeover node (e.g., a respective one of data modules 113/123) to implement the functions of flow 400, perhaps utilizing network communication functionality of an associated network module of the takeover node (e.g., a respective one of network modules 112/122).

Flow 400 of the illustrated embodiment begins at block 401 wherein partner node failure is suspected. For example, nodes 110 and 120 may be provided in a HA pair configuration, wherein in operation node 120 may suspect failure of node 110 due to a heartbeat signal provided by node 110 no longer being received by node 120.

At block 402 of the embodiment illustrated in FIG. 4, a failure detection process is started to determine whether the partner node has in fact failed. Continuing with the above example, node 120 may invoke one or more process to determine if partner node 110 has actually failed, or is operational despite its heartbeat signal not having been received. For example, node 120 may monitor for the heartbeat signal for a predetermined amount of time and, if the heartbeat signal is not detected within that time, conclude that node 110 has failed. Additionally or alternatively, node 120 may monitor I/O activity with respect to storage media 131 to determine if node 110 is functioning. Of course, other or additional techniques for determining the state of a partner node may be implemented according to embodiments of the invention.

In parallel with operation to determine the operational state of the partner node, the illustrated embodiment of flow 400 proceeds to access the copy of the mount catalog of the partner node aggregate belonging to the last successful CP at block 403. Continuing with the above example, node 120 may access mount catalog copy CP0 of mount catalog 132. Node 120 may thus obtain the disk identification information and DBN information for reading blocks used to mount the volumes of the aggregate(s) of node 110 suspected to have failed.

At block 404 of the illustrated embodiment, the volume information stored in the blocks identified by the mount catalog is read and stored in memory of the takeover node. For example, the takeover node may pre-fetch the blocks and build a cache to locate pre-fetched blocks while the volume is mounting during takeover. Continuing with the foregoing example, node 120 may operate to read the blocks identified by mount catalog 132 and populate a DBN based cache for use in mounting the volumes of node 110.

A determination is made as to whether or not the partner node has failed, through conclusion of the aforementioned failure detection process, at block 405 of the embodiment illustrated in FIG. 4. Continuing with the above example, node 120 may conclude that node 110 has failed due to the node 110 heartbeat signal not having been received for a predetermined amount of time, due to no I/O activity having been detected with respect to storage media 131, etc.

If it is determined that the partner node has not failed, processing according to the illustrated embodiment of flow 400 proceeds to block 406 wherein the information pre-fetched from the blocks identified in the mount catalog is discarded. Continuing with the foregoing example, node 120 may operate to purge, or otherwise not utilize, information read from the blocks of data store device 130 identified by mount catalog 132, whereby each of nodes 110 and 120 continue to operate with respect to their aggregates and volumes.

However, if it is determined that the partner node has failed, processing according to the illustrated embodiment of flow 400 proceeds to block 407 wherein the information pre-fetched from the blocks identified in the mount catalog is used to mount the volumes. Continuing with the foregoing example, takeover node 120 may operate to use the volume information read from the blocks of data store device 130 identified by mount catalog 132 to mount the aggregate(s) and volume(s) of failed node 110.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
reading, by a computing device, into memory, volume information stored in one or more blocks identified by a mount catalog of another computing device upon suspecting failure of the other computing device and prior to determining that the other computing device has failed;
determining, by the computing device, when the other computing device has failed in parallel with reading into memory the volume information stored in the one or more blocks identified by the mount catalog of the other computing device; and
mounting, by the computing device, one or more volumes of the other computing device using the volume information, when the determining indicates that the other computing device has failed.

2. The method of claim 1, wherein the computing devices comprise partner nodes of a high availability pair and the method further comprises suspecting, by the computing device, failure of the other computing device when a heartbeat signal from the other computing device is not detected.

3. The method of claim 1, further comprising accessing, by the computing device, the volume information via the mount catalog without bringing online an aggregate of storage media of the other computing device containing the one or more volumes.

4. The method of claim 1, further comprising ignoring or discarding, by the computing device, the volume information read into memory when the determining indicates that the other computing device has not failed.

5. The method of claim 1, further comprising analyzing, by the computing device, input/output operations with respect to storage media of the other computing device, wherein the determining is based on the analysis of the input/output operations.

6. The method of claim 1, wherein the mount catalog comprises direct storage level based information comprising disk identification information and disk block number information.

7. A non-transitory computer readable medium having stored thereon instructions for facilitating high availability in a data storage environment comprising machine executable code which when executed by at least one machine, causes the machine to:
read, into memory, volume information stored in one or more blocks identified by a mount catalog of a computing device upon suspecting failure of the computing device and prior to determining that the computing device has failed;
determine when the computing device has failed in parallel with reading into memory the volume information stored in the one or more blocks identified by the mount catalog of the computing device; and
mount one or more volumes of the computing device using the volume information, when the determining indicates that the data computing device has failed.

8. The non-transitory computer readable medium as set forth in claim 7, wherein the computing device comprises a partner node of a high availability pair and the machine executable code when executed by the machine, further causes the machine to suspect failure of the computing device when a heartbeat signal from the computing device is not detected.

9. The non-transitory computer readable medium as set forth in claim 7, wherein the machine executable code when executed by the machine, further causes the machine to access the volume information via the mount catalog without bringing online an aggregate of storage media of the computing device containing the one or more volumes.

10. The non-transitory computer readable medium as set forth in claim 7, wherein the machine executable code when executed by the machine, further causes the machine to ignore or discard the volume information read into memory when the determining indicates that the computing device has not failed.

11. The non-transitory computer readable medium as set forth in claim 7, wherein the machine executable code when executed by the machine, further causes the machine to analyze input/output operations with respect to storage media of the computing device, wherein the determining is based on the analysis of the input/output operations.

12. The non-transitory computer readable medium as set forth in claim 7, wherein the mount catalog comprises direct storage level based information comprising disk identification information and disk block number information.

13. A computing device, comprising:
a memory containing machine readable medium comprising machine executable code having stored thereon instructions for handling storage element failures to reduce storage device failure dates; and
a processor coupled to the memory, the processor configured to execute the machine executable code to cause the processor to:
read, into the memory, volume information stored in one or more blocks identified by a mount catalog of another computing device upon suspecting failure of the other computing device and prior to determining that the other computing device has failed;
determine when the other computing device has failed in parallel with reading into the memory the volume information stored in the one or more blocks identified by the mount catalog of the other computing device; and
mount one or more volumes of the other computing device using the volume information, when the determining indicates that the other computing device has failed.

14. The computing device as set forth in claim 13, wherein the computing devices comprise partner nodes of a high availability pair and the processor is further configured to execute the machine executable code to cause the processor to suspect failure of the other computing device when a heartbeat signal from the other computing device is not detected.

15. The computing device as set forth in claim 13, wherein the processor is further configured to execute the machine executable code to cause the processor to access the volume information via the mount catalog without bringing online an aggregate of storage media of the other computing device containing the one or more volumes.

16. The computing device as set forth in claim 13, wherein the processor is further configured to execute the machine executable code to cause the processor to ignore or discard the volume information read into the memory when the determining indicates that the other computing device has not failed.

17. The computing device as set forth in claim 13, wherein the processor is further configured to execute the machine executable code to cause the processor to analyze input/output operations with respect to storage media of the other computing device, wherein the determining is based on the analysis of the input/output operations.

18. The computing device as set forth in claim 13, wherein the mount catalog comprises direct storage level based information comprising disk identification information and disk block number information.

* * * * *